Aug. 31, 1943.  L. H. MIDDLETON  2,328,223
BATTERY FILLING VENT
Filed May 23, 1940
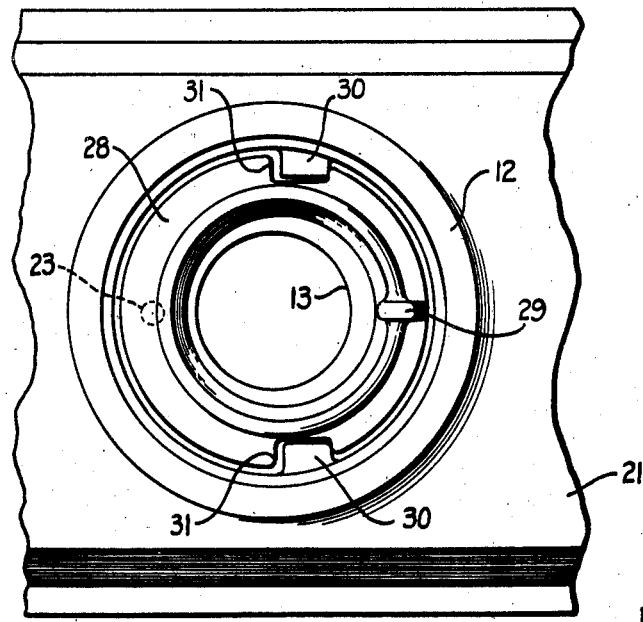
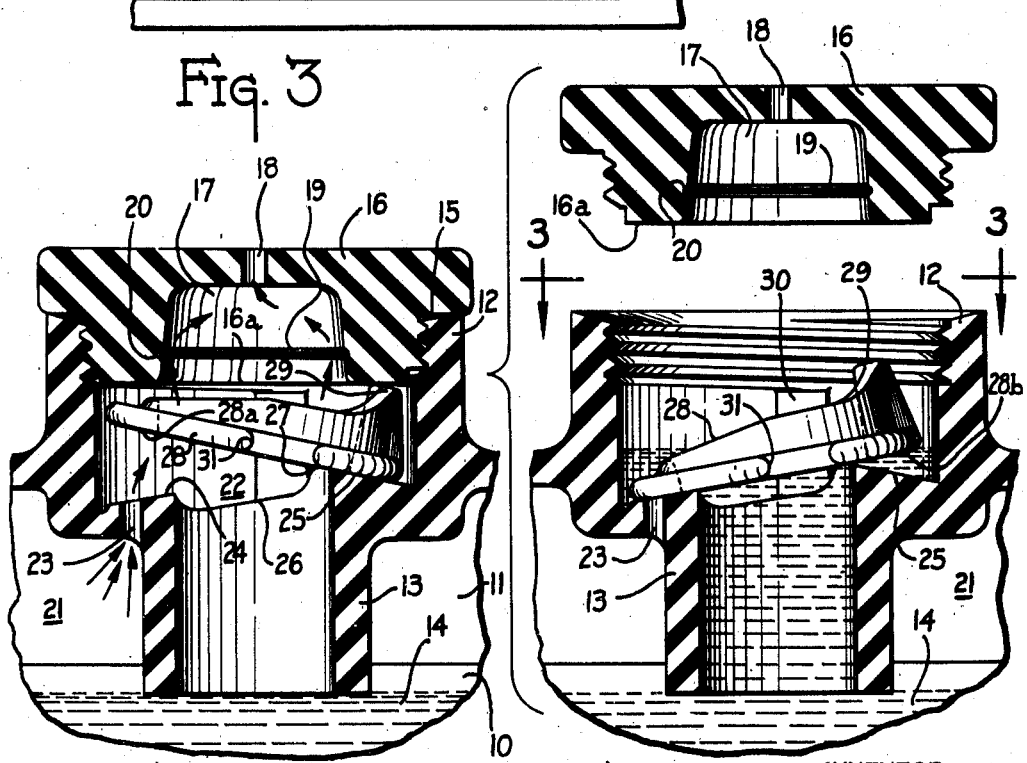
INVENTOR
LESLIE H. MIDDLETON
BY
Falvey, Souther & Stoltenberg
ATTORNEYS

Patented Aug. 31, 1943

2,328,223

UNITED STATES PATENT OFFICE 2,328,223

BATTERY FILLING VENT

Leslie H. Middleton, Toledo, Ohio

Application May 23, 1940, Serial No. 336,796

3 Claims. (Cl. 136—178)

This invention relates to filling and venting devices for electric storage batteries, more particularly to such devices in which the electrolyte level in the individual cells is predetermined during the filling action by the venting device.

Although the art relating to filling and venting devices is replete with structures designed to limit the amount of water to be added to the cell of a storage battery of the lead acid type, a satisfactory filling and venting device to fulfill the purpose set forth, which, at the same time, is simple in operation and easy to manufacture is still wanting in the art. This is particularly true at the present time when the trend is to position the storage battery under the hood of the automotive engine inasmuch as a superfluity of electrolyte in the cell will tend to cause an overflow and splashing when the temperature of the battery is elevated under operating conditions. The battery being mounted at a relatively elevated position under the hood of the automobile causes the overflow to splash down upon the working mechanisms of the automobile, particularly the relatively exposed parts of the insulation of the electrical cables etc., whereby the insulation is destroyed to cause a break-down of the ignition system. The present invention is designed to prevent the filling of the battery cell beyond a predetermined point, and, at the same time, to adequately vent the cell under operating conditions.

The invention attains this objective by creating an enclosed chamber at the upper end of the cell which is adapted to entrap air over the electrolyte during the filling operation of the cell to prevent the further addition of water to the cell. The enclosed space is, however, at the same time, capable of being vented to the atmosphere during the operating conditions of the cell, so as to allow the escape of gases given off by the electrolyte during the charging and discharging operations of the cell. A manually operated valve member is provided to cooperate with the filling cap to open and close the vent means at selected times, more particularly to open the vent means when the cap is in closed position and to close the vent means when the cap is removed to make ready for the filling operation.

It is, therefore, a principal object of this invention to provide a filling and venting device for a storage battery of the lead acid type which will facilitate servicing of the battery by enabling an attendant to add water and obtain a uniform level of electrolyte in each of the cells of a battery without the display of unusual care and observation whereby splashing and overflowing of the acid electrolyte from the cell during operating conditions thereof is substantially obviated.

It is a further object of this invention to provide a filling and venting device for a storage battery cell in which an enclosed space is provided above the electrolyte having a controllable vent means which, during the filling operation, is closed to entrap air in the enclosed space to prevent the level of the electrolyte during the filling operation to be raised above a predetermined level; the vent means being adapted to be opened by the positioning of the closure cap to allow the escape of gases given off by the electrolyte during the normal operation of the battery cell.

It is a further object of the invention to provide a venting and filling device for a storage battery which is of very simple construction, so as to obviate service difficulties in the field during the use of the battery cell and, at the same time, to provide a structure which is capable of being fabricated at a minimum cost.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawing forming a part of this specification wherein like reference characters designate corresponding parts in the several views.

Figure 1 is an elevational view in section, showing the vent in open position.

Figure 2 is an elevational view in section with the closure cap removed, showing the vent in closed position.

Figure 3 is a plan view taken along the line 3—3 of Figure 2.

Referring to Figure 1, the top portion of a cell of a storage battery of the lead acid type is illustrated being cut away to show only the essential details of this invention. The cell is enclosed in a usual container 10 which is provided with an upper closure plate 11 firmly cemented in position in any suitable manner as is well known in the art and need not be described in detail. At a convenient location in the cell, preferably at a central location, a hollow integral boss 12 is provided which extends upwardly and outwardly from the closure plate 11, the plate being provided at a concentric location with the boss 12 with a depending annular skirt 13 whose diametrical dimension is smaller than that of the boss 12 and whose lower end terminates in the datum at which it is desired to maintain the level of the electrolyte 14 of the battery cell.

Adjacent the upper end of the boss 12, internally positioned threads 15 are provided which are adapted to cooperate with a threaded plug 16 preferably positioned in the boss to close the same by approximately three quarters of a turn of the plug, which is sufficient to firmly seat the plug in position. The plug 16 is of a well known type, being provided with an inner central depression 17 which is vented to the atmosphere by an aperture 18. The depression is closed adjacent its lower terminus by a circular plate 19 fitted into an annular groove 19a. The plate is provided with two apertures 20 adjacent its periphery, so as to place the cell of the battery in communication with the vent 18 to allow the escape of gases collected in a closed chamber 21 over the electrolyte of the cell. The gases collected in the chamber 21 escape into a second smaller chamber 22, located in the body of the boss 12 through an aperture 23, located in a sloping floor portion 24 formed between the two chambers adjacent the upper end of the depending skirt 13. With the vent 23 open, the gases formed by the cell can readily escape from the collecting chamber 21 into the secondary chamber 22, then through the apertures 20 into the depression 17 and out to the atmosphere through the aperture 18. This flow of gases is clearly shown by arrows in Figure 1.

The annular area between the boss 12 and the skirt 13 in which the sloping floor 24 is formed adjacent one side of the upper end of the depending skirt 13 is formed with a second sloping portion 25 which is positioned at an angle to the portion 24, being diametrically opposed therefrom and terminating relatively higher than the floor portion 24. Between the two floor portions 24 and 25, the material is preferably gouged away as shown at 26 to provide a pivotal portion 27 adjacent the inner edge of the floor portion 25. The pivotal portion 27 is located at the apex of the planes of the floor portions 24 and 25, being preferably slightly rounded as shown.

Oscillating on the pivotal portion 27, a torus-shaped valve member 28 is provided which is adapted to move on the pivotal portion 27, so as to cooperate alternately with the floor portions 24 and 25 under the control of the closure cap 16. Flat lower surfaces 28a and 28b are provided on the valve member 28 to cooperate with the floor portions 24 and 25 respectively. The closure cap 16 is adapted to control the movements of the valve member 28 by cooperating with an upwardly-projecting lug 29 which is formed in the valve member 28 at a point disposed above the floor portion 25. When the closure cap 16 is screwed into position by the operator, the lower surface 16a thereof contacts the lug 29, so as to thrust the valve member against the floor portion 25, to assume a position parallel thereto as is clearly shown in Figure 1. Under these conditions, the valve member will be free from the floor portion 24 to allow the gases to escape through the open vent 23 into the chamber 22 wherefrom they subsequently escape as described above.

In order to hold the valve member 28 in operative position in the chamber 22 with reference to the floor portions 24 and 25 to prevent dragging during movement, guide members 30 are provided to extend from the inner wall of the chamber 22 in the boss 12 to cooperate with notches 31 cut in the periphery of the valve member 28. The guide members 30 are preferably positioned slightly displaced from the center line in the direction of the floor portion 25 as is clearly shown in Figures 1 and 3.

When the closure cap 16 is removed from cooperative relation with the boss 12, as is clearly shown in Figure 2, the force of gravity acting upon the valve member 28 whose center of gravity is displaced from the pivot portion toward the floor portion 24 will oscillate the valve member about the pivotal point 27 to assume a position as shown in Figure 2 wherein the valve member is cooperating with the floor portion 24 in a manner to close the aperture 23 to prevent escape of gases from the chamber 21. While the valve member is in this condition, an attendant performs the filling operation of the battery cell by introducing water into the chamber 22, so as to flow into the battery cell through the aperture in the skirt 13. The introduction of water wets the lower surface 28a of valve member and the floor portion 24 to give a good seal therebetween. Inasmuch as the aperture 23 is closed by the valve member 28, the gases in the chamber 21 will be compressed after the water in the cell assumes a level which is higher than the bottom portion of the depending skirt 13. As the gases become compressed, the water introduced into the chamber 22 will no longer flow into the battery cell but will back up into the chamber 22 to assume a position generally shown in Figure 2. With the water level rising in the chamber 22, the attendant is advised that the electrolyte in the cell has attained its predetermined level, so that no further water should be added to the cell.

The closure cap of the cell is then replaced to the position shown in Figure 1 wherein the valve member 28 has been removed from its contact with the floor portion 24 through the cooperative relation between the closure plug 16 and the upstanding lug portion 29 of the valve member 28. With the parts in this relation, the cell is in normal operating condition in which the aperture 23 is open to allow the escape of gases formed in the chamber 21 from the cell by the aperture 23, chamber 22, and apertures 20 and 18. The battery closure plug will remain in normal position until it is again necessary to raise the level of the electrolyte due to depletion at the time of periodic check of the cell.

It is to be understood that the above detailed description of the present invention is intended to disclose an embodiment thereof to those skilled in the art, but that the invention is not to be construed as limited in its application to the details of construction and arrangement of parts illustrated in the accompanying drawing, since the invention is capable of being practiced and carried out in various ways without departing from the spirit of the invention. The language used in the specification relating to the operation and function of the elements of the invention is employed for purposes of description and not of limitation.

What is claimed is:

1. In a device of the class described, a battery cell having an enclosure to contain electrolyte at a predetermined level, a tubular member depending from the upper wall of the enclosure and opening in substantially the predetermined level of the electrolyte, a concentric open chamber formed above and in communication with the tubular member, the walls thereof being provided with integral guide means projecting into the chamber, a threaded plug having an outlet vent to open and close the chamber selectively by cooperating with threads formed in the wall of the chamber, a ridge formed in the floor of the chamber the apex of which extends between the guide means, a pair of plane surfaces formed in the floor of the chamber adapted to transect in the ridge, one of the plane surfaces distal from the ridge being provided with an aperture through the floor of the chamber for communication from the chamber with the interior of the enclosure above the level of the predetermined level of the electrolyte, and a valve member having at least one flat side pivoted on the ridge, said valve member being slotted at its sides to loosely embrace the guide means and provided with a raised portion on one side of the slots, and being adapted by gravity to cooperate by its flat side with the plane surface having the aperture when the closure plug is removed to seal the aperture and with the other plane under the influence of the plug by thrust against the raised portion of the valve member when the plug is in closed position to open the aperture and allow the escape of gas formed above the electrolyte.

2. In a device of the class described, a battery cell having an air-tight enclosure to contain electrolyte at a predetermined level, a chamber formed in the upper wall of the enclosure, a tubular portion depending from the floor of the chamber and opening at substantially the level of the electrolyte, a closure and venting cap removably positioned on the exterior portion of the chamber and adapted to be removed manually for filling the enclosure to the predetermined level with water, whereby air entrapped above the opening of the depending portion determines the amount of water added, a pair of planar surfaces formed in the floor of the chamber transecting to form an obtuse angular ridge, one of the planar surfaces being provided with an aperture in communication with the enclosure, a perforated valve member having at least one flat side adapted to tilt on the ridge to cooperate by its flat side with the planar surfaces successively, with one planar surface by gravity to close the aperture forming a vent for the entrapped air when the cap is removed from the chamber and with the other planar surface by the action of the cap against the action of gravity when the cap is driven home to close the chamber, and integral means projecting from the chamber walls and cooperating with the valve member to maintain the valve member in centered relation with the chamber to prevent binding with the walls thereof.

3. In a device of the class described, a battery cell having an air-tight enclosure to contain electrolyte at a predetermined level, a chamber formed in the upper wall of the enclosure, a depending tubular portion opening at substantially the predetermined level of the electrolyte placing the enclosure in communication with the chamber, a closure and venting cap removably positioned on the upper portion of the chamber and adapted to be manually removed for filling the enclosure with water to the predetermined level by trapping air in the enclosure above the opening of the depending portion to determine the amount of water added, an elevated ridge formed in the floor of the chamber to provide a pivot means, a pair of planar surfaces forming a part of the floor of the chamber adjacent diametrically opposed sides thereof and transecting in the elevated ridge at a point displaced from the center of the chamber, one surface of relatively small area distal from the ridge being pierced with an aperture to obtain communication between the chamber and the enclosure at a point above the predetermined level of the electrolyte to allow escape of entrapped air, the other surface terminating in the pivotal ridge, a perforated valve member having at least one flat side adapted to turn on the pivotal ridge to cooperate with the planar surfaces successively, said valve cooperating with the surface having the aperture under the influence of gravity to close the aperture and prevent escape of entrapped air during the filling operation, said valve cooperating with the other planar surface under the influence of the cap against the action of gravity when the cap is driven home to closed position to allow entrapped air and gases to escape through the aperture from the enclosure to the chamber, which in turn is vented to the atmosphere by the vented cap, integral means on the walls of the chamber adjacent the ends of the ridge projecting into the chamber, and slot means in the valve member loosely embracing the integral means to prevent valve member from rotating in the chamber.

LESLIE H. MIDDLETON.